United States Patent

Junge

[11] 4,053,463
[45] Oct. 11, 1977

[54] HETEROCYCLIC AZO PIGMENTS
[75] Inventor: Helmut Junge, Wachenheim, Germany
[73] Assignee: BASF Aktiengesellschaft, Ludwigshafen, Germany
[21] Appl. No.: 699,988
[22] Filed: June 25, 1976
[30] Foreign Application Priority Data
   July 26, 1975    Germany ............................ 2533529
[51] Int. Cl.² .................. C09B 29/36; D06P 1/04; D06P 1/44; D06P 2/79
[52] U.S. Cl. ........................... 260/154; 106/23; 106/288 Q; 260/208; 260/251 QB; 260/295 AM; 544/195
[58] Field of Search ............................... 260/154
[56] References Cited
   U.S. PATENT DOCUMENTS

| | | |
|---|---|---|
| 3,941,766 | 3/1976 | Dimroth et al. .................. 260/155 |
| 3,963,693 | 6/1976 | Mory ................................. 260/154 |
| 3,980,673 | 9/1976 | Henzi ............................ 260/146 D |

FOREIGN PATENT DOCUMENTS

| | | |
|---|---|---|
| 1,136,673 | 12/1968 | United Kingdom ................. 260/154 |

*Primary Examiner*—Floyd D. Higel
*Attorney, Agent, or Firm*—Keil, Thompson & Shurtleff

[57] ABSTRACT

An azo pigment of the formula:

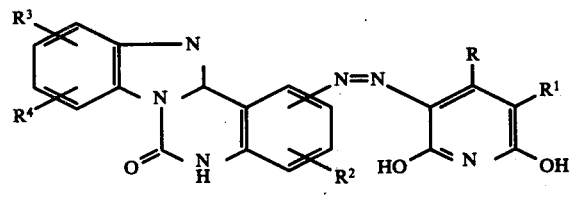

in which
   R is hydrogen or methyl;
   $R^1$ is cyano or carbamoyl;
   $R^2$ is hydrogen, chloro, bromo, methyl, methoxy, ethoxy or cyano;
   $R^3$ is hydrogen, chloro, bromo, methyl, methoxy, ethoxy, cyano, carbomethoxy, carbamoyl, sulfamoyl or methylsulfonyl; and
   $R^4$ is hydrogen, chloro, bromo, methyl, methoxy or carbomethoxy.

The compounds are eminently suitable as pigments in printing inks, surface coatings or plastics.

2 Claims, No Drawings

HETEROCYCLIC AZO PIGMENTS

The invention relates to novel azo compounds useful as pigments and having the general formula:

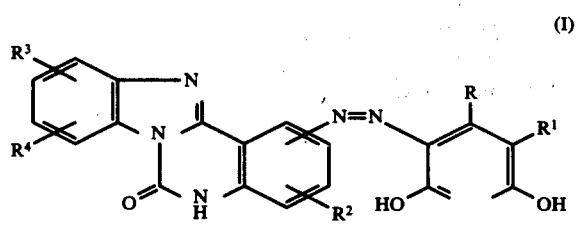

in which R is hydrogen or methyl; $R^1$ is cyano or carbamoyl; $R^2$ is hydrogen, chloro, bromo, methyl, methoxy, ethoxy or cyano; $R^3$ is hydrogen, chloro, bromo, methyl, methoxy, ethoxy, cyano, carbomethoxy, carbamoyl, sulfamoyl or methylsulfonyl; and $R^4$ is hydrogen, chloro, bromo, methyl, methoxy or carbomethoxy.

The new compounds of the formula (I) can be prepared by diazotizing amines of the general formula:

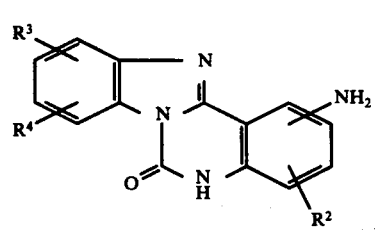

in which $R^2$, $R^3$, and $R^4$ are each as defined above and coupling the product with a compound of the general formula:

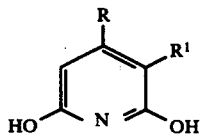

in which R and $R^1$ are each as defined above. The coupling reaction may be effected by a conventional method.

Amines of the formula (III) may be obtained by reduction of nitro-6,7-dihydrobenzimidazo[1,2-c]quinazo-6-lones accessible from nitroanthranilic acid or nitroisatoic anhydride and o-phenylene diamines (see Ber. dtsch.chem.Ges. 32, 1478 (1898), Angew. Chem. 79, 901–902 (1967)). The pigments are not always obtained directly in an optimal physical form for all purposes but they can be converted into a form suitable for a particular use by known methods such as grinding, swelling or recrystallization.

Compounds of formula (I) have high color strength and excellent fastness to light and weathering in full shade, fastness to overspraying and overcoating, high brilliance and good hiding power.

The compound of the formula (II) below is of particular industrial value:

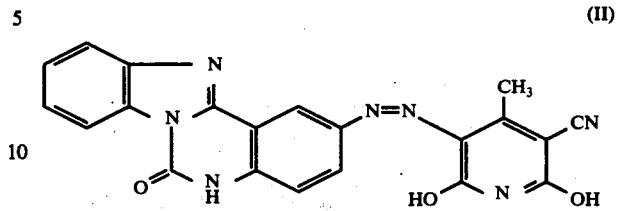

The above compound is an excellent pigment for use in printing inks and surface coatings (e.g. melamine resin, acrylate resin or polyester surface coatings), and is particularly useful for coloring plastics materials such as polystyrene, polyvinyl chloride or polyurethanes.

The following specific Examples are intended to illustrate the invention, parts and percentages in the Examples being by weight.

EXAMPLE 1

31.3 parts of the amine of the formula:

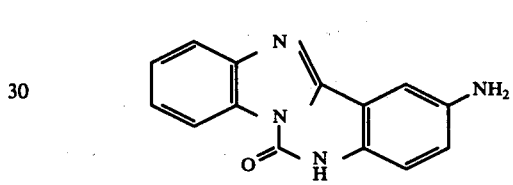

is dissolved in 150 parts of 98% sulfuric acid at a temperature of 20° to 25° C and diazotization is carried out at 0° to 5° C with 40 parts of nitrosylsulfuric acid. The whole is stirred for another three hours at 0° to 5° C, poured onto 600 parts of ice and the excess of nitrite is destroyed by adding urea. A solution of 25 parts of 3-cyano-2,6-dihydroxy-4-methylpyridine in 250 parts of water is then added and the pH is adjusted to a value of 4 to 5 using dilute aqueous caustic soda solution. Stirring is continued for another hour and the product is suction filtered and washed with water and then with methanol.

The resulting moist orange filter cake is heated for one hour in 800 parts of methanol under reflux, cooled to ambient temperature, suction filtered and dried. 50.6 parts of a bluish red pigment is obtained which when used in an amount of 1%, without titanium dioxide, for coloring plasticized PVC gives a PVC composition having very strong hiding power, very good fastness to migration and good light fastness.

Colorations which are fast to overcoating, of great hiding power and unusually great depth are obtained when coloring melamine resin surface coatings by a conventional method.

Pigments producing the hues given in the following Table when incorporated into surface coatings are obtained in a manner analogous to Example 1 from the amines and coupling components whose formulae are given in the Table.

TABLE

Coupling component:

$$\text{HO}-\underset{\underset{\text{N}}{\|}}{\overset{\overset{\text{R}}{|}}{\text{C}}}=\underset{\underset{\text{OH}}{}}{\overset{\overset{\text{R}^1}{|}}{\text{C}}}$$

| Example | Amine | Coupling component | Hue |
|---|---|---|---|
| 2 | 2-aminophenyl benzimidazolinone-carboximidamide with 5-NH₂ | R = —CH₃, R¹ = —CONH₂ | carmine |
| 3 | 4-methyl-2-aminophenyl benzimidazolinone-carboximidamide with 5-NH₂ | R = —CH₃, R¹ = —CN | orange |
| 4 | '' | R = —CH₃, R¹ = —CONH₂ | yellow |
| 5 | 4,5-dimethyl-2-aminophenyl benzimidazolinone-carboximidamide with 5-NH₂ | R = —CH₃, R¹ = —CN | orange |
| 6 | '' | R = —CH₃, R¹ = —CONH₂ | yellow |
| 7 | 5-chloro-2-aminophenyl benzimidazolinone-carboximidamide | R = —CH₃, R¹ = —CN | orange |
| 8 | '' | R = —CH₃, R¹ = —CONH₂ | yellow |
| 9 | 2-aminophenyl benzimidazolinone-carboximidamide with NH₂ | R = —CH₃, R¹ = —CN | orange |
| 10 | '' | R = —CH₃, R¹ = —CONH₂ | yellow |
| 11 | 2-aminophenyl benzimidazolinone-carboximidamide with Br and NH₂ | R = —CH₃, R¹ = —CN | brown |
| 12 | '' | R = —CH₃, R¹ = —CONH₂ | brown |

TABLE-continued

| Example | Amine | coupling component: <br> (pyridine with R, R¹, HO, OH) | Hue |
|---|---|---|---|
| 13 | 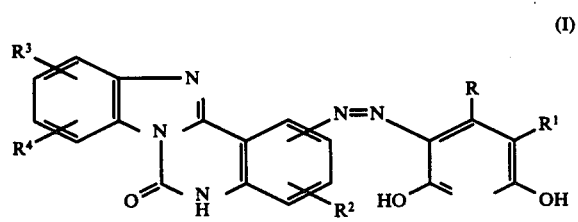 | R = —H<br>R¹ = —CN | red |
| 14 | " | R = —H<br>R¹ = —CONH₂ | red |

I claim:
1. An anzo compound of the formula:

(I)

in which
R is hydrogen or methyl;
R¹ is cyano or carbamoyl;
R² is hydrogen, bromo, chloro, methyl, methoxy, ethoxy or cyano;
R³ is hydrogen, chloro, bromo, methyl, methoxy, ethoxy, cyano, carbomethoxy, carbamoyl, sulfamoyl or methylsulfonyl; and
R⁴ is hydrogen, chloro, bromo, methyl, methoxy or carbomethoxy.

2. A compound as claimed in claim 1 and having the formula:

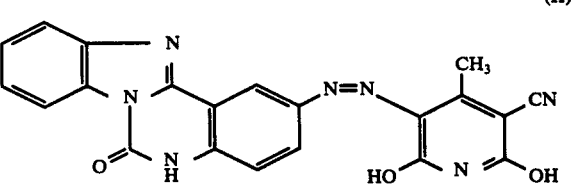

(II)

* * * * *